United States Patent
Hasegawa (10) Patent No.: US 8,391,391 B2
(45) Date of Patent: Mar. 5, 2013

(54) WIRELESS COMMUNICATION APPARATUS AND WIRELESS COMMUNICATION CONTROLLING METHOD

(75) Inventor: Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 873 days.

(21) Appl. No.: 12/466,870

(22) Filed: May 15, 2009

(65) Prior Publication Data
US 2010/0034311 A1 Feb. 11, 2010

(30) Foreign Application Priority Data

Aug. 8, 2008 (JP) ................................. 2008-205794

(51) Int. Cl.
*H04B 7/02* (2006.01)
*H04L 27/00* (2006.01)
(52) U.S. Cl. ....................................... 375/267; 375/299
(58) Field of Classification Search .................. 375/260, 375/267, 299
See application file for complete search history.

(56) References Cited

U.S. PATENT DOCUMENTS

| 8,194,771 | B2 * | 6/2012 | Hammerschmidt et al. ... | 375/267 |
| 2001/0050963 | A1 * | 12/2001 | Yoneyama .................. | 375/267 |

FOREIGN PATENT DOCUMENTS

| JP | 2003-143651 | 5/2003 |
| JP | 2005-506720 | 3/2005 |
| JP | 2007-306167 | 11/2007 |
| JP | 2009-164751 | 7/2009 |
| JP | 2009-267988 | 11/2009 |
| WO | 02/073870 | 9/2002 |

OTHER PUBLICATIONS

Notice of Rejection issued for corresponding Japanese Patent Application No. 2008-205794, mailed Dec. 4, 2012, with English translation.

Yukimasa Nagai et al.; "324Mbps WLAN Equipment with MAC Frame Aggregation for High MAC-SAP Throughput"; Journal of Communications, vol. 1, No. 5; URL http://ojs.academypublisher.com/index.php/jcm/article/view/01050108/108; Aug. 2006.

* cited by examiner

*Primary Examiner* — David B Lugo
(74) *Attorney, Agent, or Firm* — Myers Wolin, LLC (57) ABSTRACT

To reduce the influence of Doppler shift, with the sub-carrier interval being widened in a high-frequency band, transmission timings of frames for every frequency band are matched each other. By matching the frame transmission timings, at the receiving side, once the modulation timing in one frequency band is detected, the modulation timing at another frequency band can be obtained. Therefore, demodulation can be simplified. To match the frame transmission timings, the CP length is adjusted, for example.

10 Claims, 10 Drawing Sheets

WIRELESS COMMUNICATION APPARATUS AND WIRELESS COMMUNICATION CONTROLLING METHOD

CROSS-REFERENCE TO RELATED APPLICATION

This application is based upon and claims the benefit of priority of the prior Japanese Patent Application No. 2008-205794, filed on Aug. 8, 2008, the entire contents of which are incorporated herein by reference.

FIELD

The embodiments discussed herein are directed to a wireless communication apparatus and a wireless communication controlling method.

BACKGROUND

As a technology for expanding a wireless communication band, frequency aggregation using a bundle of frequencies has been known. In the use of frequency aggregation, for example, a 10-megahertz width is used for a band of 800 megahertz, a 30-megahertz width is used for a band of 2 gigahertz, and a 60-megahertz width is used for a band of 4 gigahertz, thereby ensuring a band width of 100 megahertz in total (see Japanese Laid-open Patent Publication No. 2007-306167).

When frequency aggregation is applied to a wireless communication apparatus using Orthogonal Frequency-Division Multiplexing (OFDM) as a modulation technique, however, a demodulation process at a receiving side may be complicated. This complication of the demodulation process is explained with reference to FIG. 10.

In mobile communication, the higher the frequency for use is, the more the wireless communication apparatus is susceptible to Doppler shift. When OFDM is used as a modulation technique, the influence of Doppler shift can be reduced by widening a sub-carrier interval. However, since widening a sub-carrier interval decreases efficiency in use of frequency, the sub-carrier interval is preferably as narrow as possible in the case of low frequency.

In view of such circumstances, when frequency aggregation is applied to a wireless communication apparatus using OFDM as a modulation technique, it would be preferable to change a sub-carrier interval for each frequency band. In OFDM, however, since the sub-carrier interval is in correlation with a sampling interval, if the sub-carrier interval is changed for each frequency band, the sample length differs for each frequency band.

Figure 10:
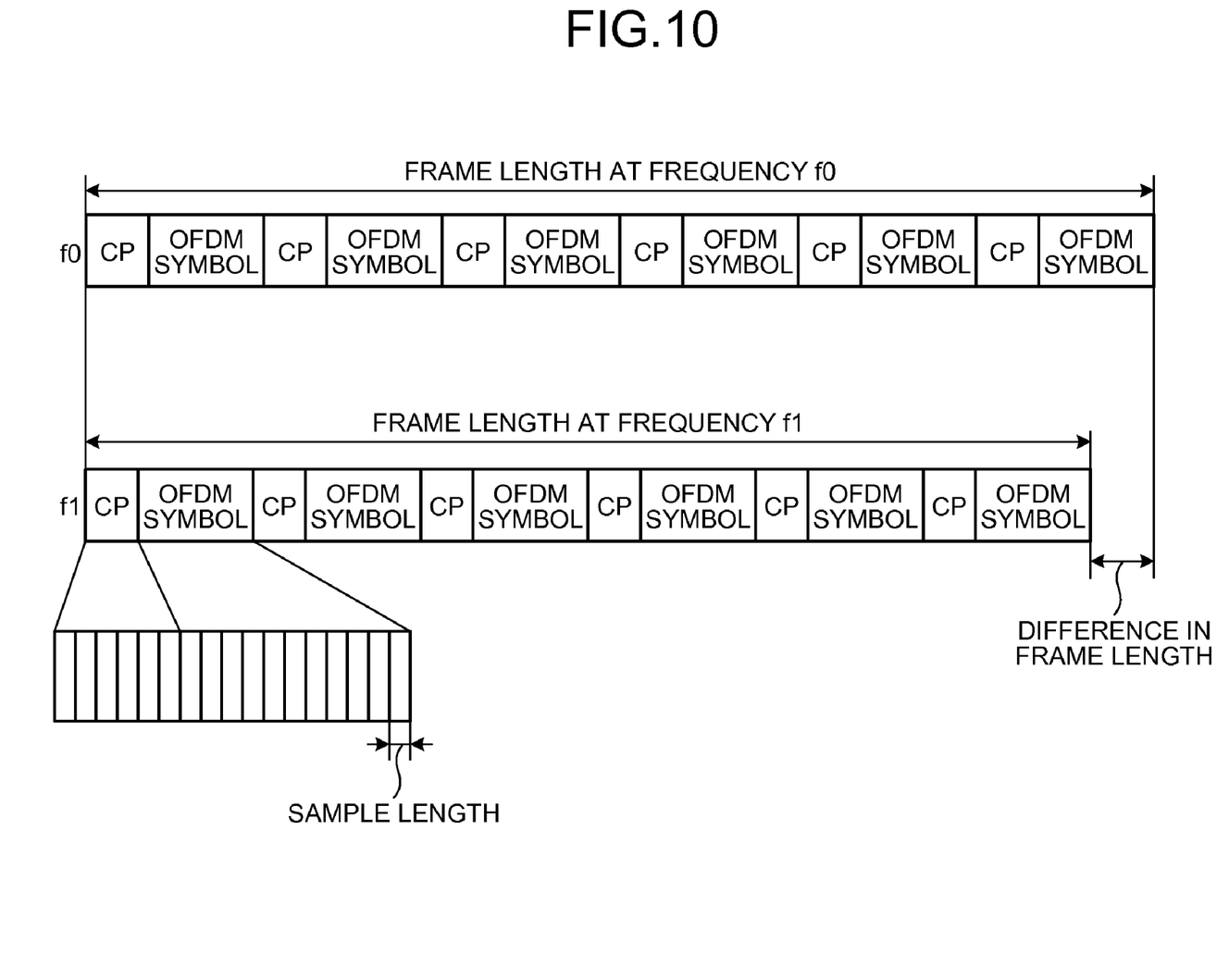
FIG. 10 is a diagram depicting a change in frame length according to a change in sub-carrier interval.

As depicted in FIG. 10, an OFDM frame includes a plurality of OFDM symbols and cyclic prefixes (CP) each disposed before every OFDM symbol. Also, the length of each of the OFDM symbols and the length of each CP are influenced by the sample length. Therefore, if the sample length differs for each frequency band, as depicted in the example in FIG. 10, the frame length of a frame at a frequency f0 may differ from the frame length of a frame at a frequency f1.

As such, if the frame length differs for each frequency band, in frequency aggregation using a bundle of frequencies, demodulation timing is required to be detected at a receiving side for each frequency band, thereby complicating the demodulation process. Although the frame length of each frequency band can be adjusted to some degree by changing the number of OFDM symbols and the length of each CP in a frame, only such adjustment is not enough to make the frame size uniform.

SUMMARY

According to an aspect of an embodiment, a wireless communication apparatus that transmits data to a counter apparatus by using a plurality of frequencies, includes a plurality of transmitting units that transmit the data corresponding to the frequencies; a distributing unit that distributes the data to be transmitted to the counter apparatus into the transmitting units; and a transmission-timing controlling unit that causes timings of transmitting frames from the transmitting units to match each other for every predetermined cycle, the frames each formed of the data distributed by the distributing unit.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENTS

With reference to the attached figures, exemplary embodiments of the wireless communication apparatus and wireless communication controlling method disclosed in the present application are explained in detail below. In the following explanation, the case is explained by way of example in which OFDM is used as a modulation technique. However, the scope to which the technology disclosed in the present application is applied is not meant to be restricted to the case in which OFDM is used as a modulation/demodulation technology. The technology disclosed in the present application can be also applied to a modulation/demodulation technique using Fast Fourier Transform (FFT) for modulation and demodulation, and can be further applied to Discrete Fourier Transform-Spread-Orthogonal Frequency Division Multiplexing (DFT-S-OFDM).

First, a wireless communication controlling method according to a first embodiment is explained. The wireless communication controlling method according to the first embodiment makes the frame length for each frequency band uniform by adjusting a sub-carrier interval so that a sampling interval is an integral multiple. Explanation is now made with a specific example below.

Figure 1:
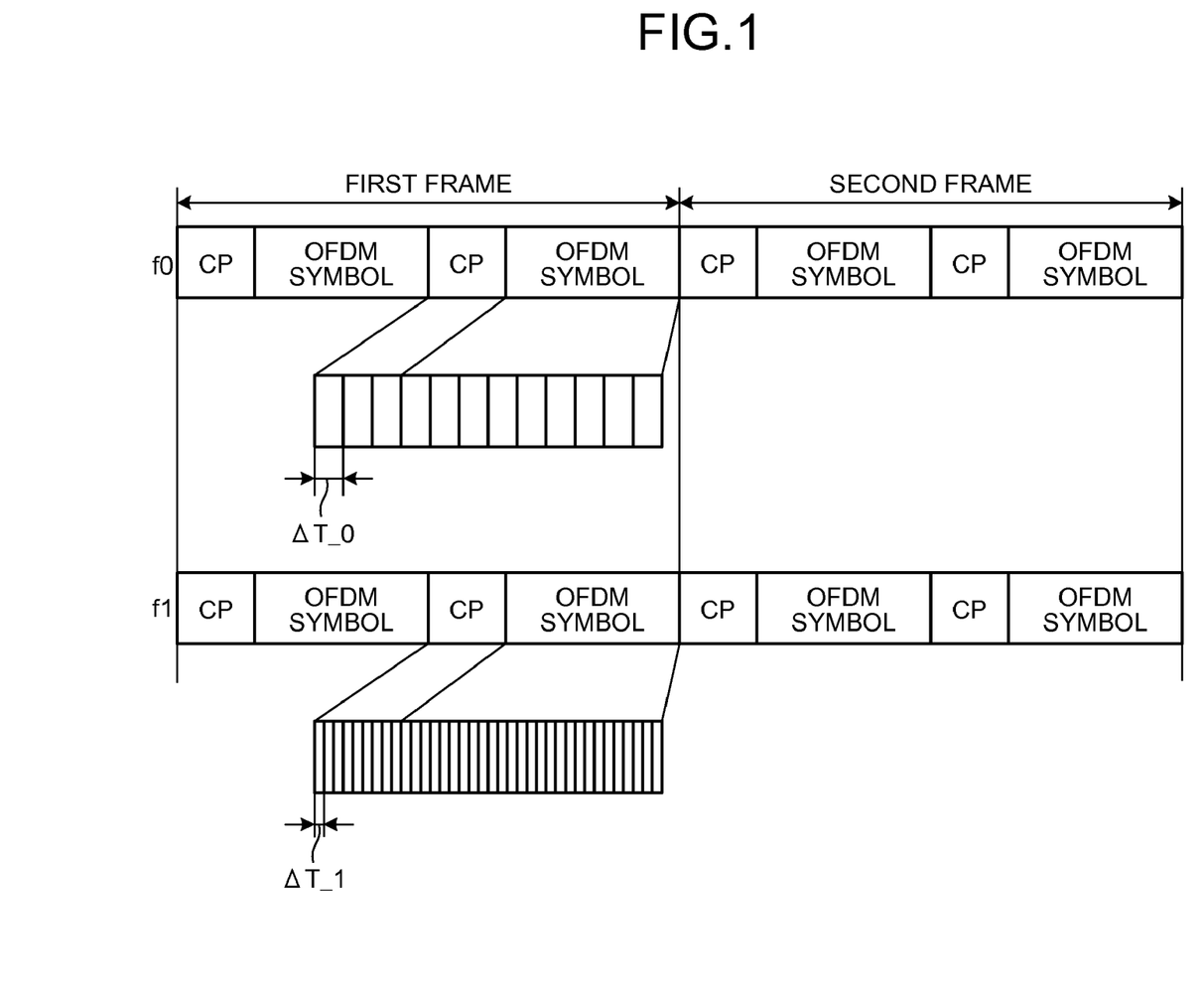
FIG. 1 is a diagram for explaining a wireless communication controlling method according to a first embodiment.

A sampling interval $\Delta T\_0$ at a frequency f0 can be represented as $$\Delta T\_0 = 1/(\Delta f\_0 \times N\_FFT\_0),$$

where $\Delta f\_0$ and N_FFT_0 are a sub-frame interval and an FFT size, respectively, at the frequency f0.

Similarly, a sampling interval $\Delta T\_1$ at a frequency f1 can be represented as $$\Delta T\_1 = 1/(\Delta f\_1 \times N\_FFT\_1)$$

where $\Delta f\_1$ and N_FFT_1 are a sub-frame interval and an FFT size, respectively, at the frequency f1.

Here, N_FFT_0 and N_FFT_1 are values generally obtained by exponentiating 2. For example, when N_FFT_0=256 and N_FFT_1=512, a ratio between $\Delta T\_0$ and $\Delta T\_1$ is as follows:

$$\Delta T\_0 / \Delta T\_1 = 2 \times \Delta f\_1 / \Delta f\_0.$$

In this case, for example, with $\Delta f\_1$ being 3/2 of $\Delta f\_0$, $\Delta T\_0$ can be made three times as large as $\Delta T\_1$. As such, if the sampling intervals are integral multiples, as depicted in FIG. 1, the frame length at the frequency f0 and the frame length at the frequency f1 can be made equal to each other by adjusting the number of OFDM symbols and the length of each CP in a frame. With these frame lengths for the respective frequency bands being uniform, once the demodulation timing is detected in one frequency band, the demodulation timing in another frequency band can be known. Thus, the demodulation process can be simplified.

Figure 2:
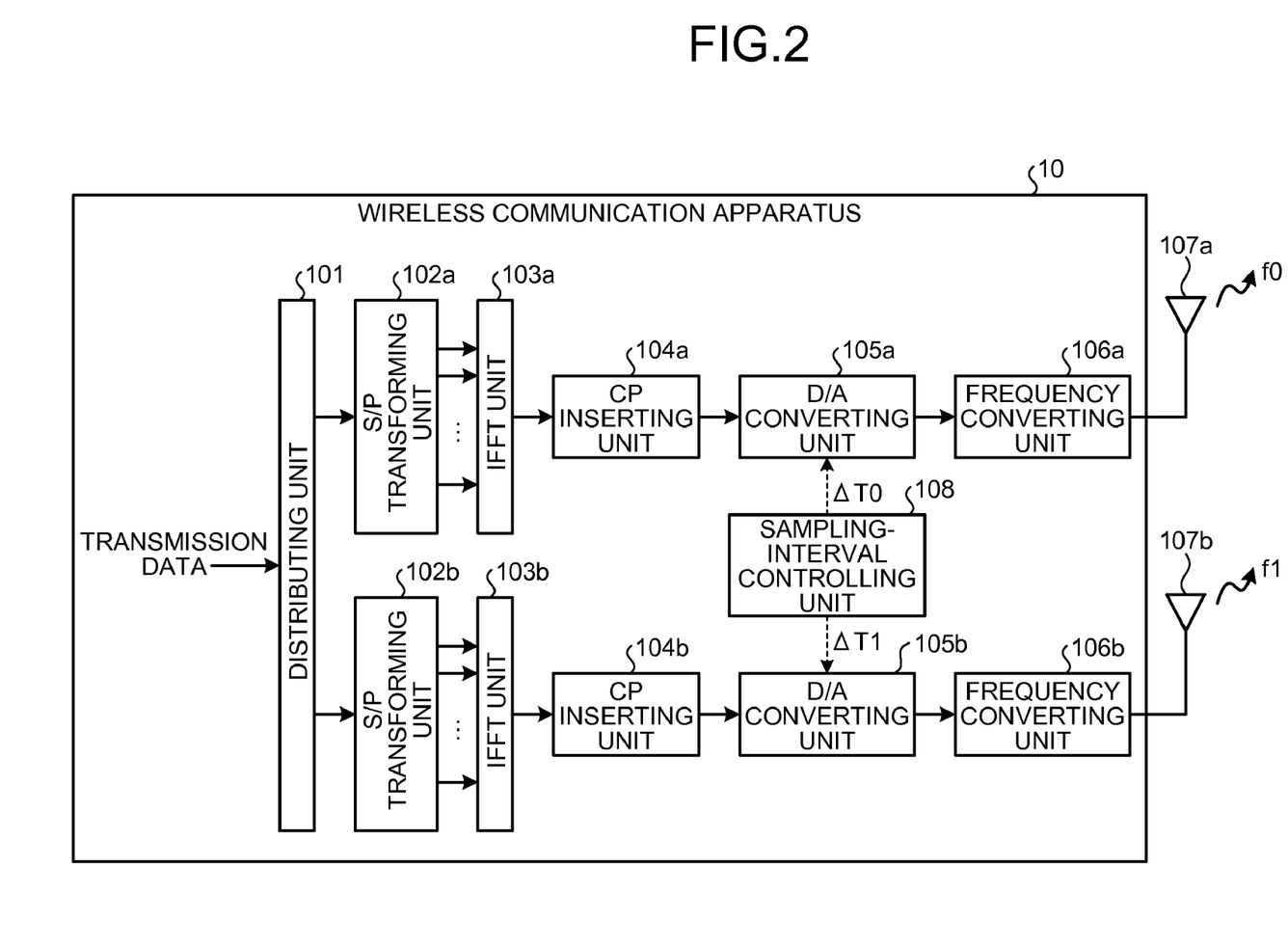
FIG. 2 is a block diagram of the configuration of a wireless communication apparatus according to the first embodiment.

Next, the configuration of a wireless communication apparatus 10 that performs the wireless communication controlling method according to the first embodiment is explained. FIG. 2 is a block diagram of the configuration of a wireless communication apparatus 10 according to the first embodiment. Although only the configuration for transmitting information is depicted in FIG. 2, the wireless communication apparatus 10 may be configured so as to wirelessly receive information. In this case, the demodulation technique may be any technique other than OFDM. Furthermore, although an example of frequency aggregation with the frequencies f0 and f1 is depicted in FIG. 2, frequency aggregation may be achieved by using three or more frequencies.

As depicted in FIG. 2, the wireless communication apparatus 10 includes a distributing unit 101, serial/parallel (S/P) transforming units 102a and 102b, Inverse Fast Fourier Transform (IFFT) units 103a and 103b, CP inserting units 104a and 104b, digital/analog converting units (D/A converting units) 105a and 105b, frequency converting units 106a and 106b, antennas 107a and 107b, and a sampling-interval controlling unit 108.

In the following explanation, when the S/P transforming units 102a and 102b do not have to be distinguished from each other, they are simply represented as an "S/P transforming unit 102". Similarly, as for the IFFT units 103a and 103b, for example, when they do not have to be distinguished from each other, they are represented with their suffixes being omitted.

The distributing unit 101 distributes transmission data into data to be transmitted at the frequency f0 and data to be transmitted at the frequency f1, and outputs the data to be transmitted at the frequency f0 to the S/P transforming unit 102a and the data to be transmitted at the frequency f1 to the S/P transforming unit 102b. The S/P transforming unit 102a maps each bit of the data to a sub-carrier for output to the IFFT unit 103a. The IFFT unit 103a transforms the data to an OFDM symbol for output to the CP inserting unit 104a.

The CP inserting unit 104a inserts a CP before an OFDM symbol by, for example, copying a rear part of the OFDM symbol. The D/A converting unit 105a performs D/A conversion on the waveform of the frame data provided with the CP at every sampling interval $\Delta T0$ specified by the sampling-interval controlling unit 108. The frequency converting unit 106a up-converts the waveform output from the D/A converting unit 105a to the frequency f0, and causes the resultant waveform to be transmitted from the antenna 107a.

The S/P converting unit 102b maps each bit of the data input from the distributing unit 101 to a sub-carrier for output to the IFFT unit 103b. The IFFT unit 103b transforms the data to an OFDM symbol for output to the CP inserting unit 104b.

The CP inserting unit 104b inserts a CP before an OFDM symbol by, for example, copying a rear part of the OFDM symbol. The D/A converting unit 105b performs D/A conversion on the waveform of the OFDM symbol provided with the CP at every sampling interval $\Delta T1$ specified by the sampling-interval controlling unit 108. The frequency converting unit 106b up-converts the waveform output from the D/A converting unit 105b to the frequency f1, and causes the resultant waveform to be transmitted from the antenna 107b.

The sampling-interval controlling unit 108 specifies the sampling interval $\Delta T0$ for the D/A converting unit 105a, and specifies the sampling interval $\Delta T1$ for the D/A converting unit 105b.

In the wireless communication apparatus 10, the sub-carrier interval of the frame to be transmitted at the frequency f0 and the sub-carrier interval of the frame to be transmitted at the frequency f1 are adjusted so that one of the sampling interval $\Delta T0$ and the sampling interval $\Delta T1$ is an integral multiple of the other. Furthermore, in the wireless communication apparatus 10, the number of OFDM symbols and the CP length in a frame are adjusted so that the frame lengths of the frequency bands are made uniform.

Here, the sampling interval and the sub-carrier interval in each frequency band and the number of OFDM symbols and the CP length in a frame may be determined in advance or may be dynamically determined so that the frame lengths are made uniform.

As explained above, in the first embodiment, with the sampling interval of one frequency band being taken as a reference, the other sampling interval is set so as to be an integral multiple of the former. Thus, the frame lengths of the respective frequency bands can be made uniform, and the demodulation process at the receiving side can be simplified.

In the first embodiment, the example is explained in which the frame lengths of the respective frequency bands are made uniform. Alternatively, the demodulation process at the receiving side can be simplified by adjusting the frame transmitting timing. In a second embodiment, an example is explained in which the demodulation process at the receiving side is simplified by adjusting the frame transmitting timing.

Figure 3:
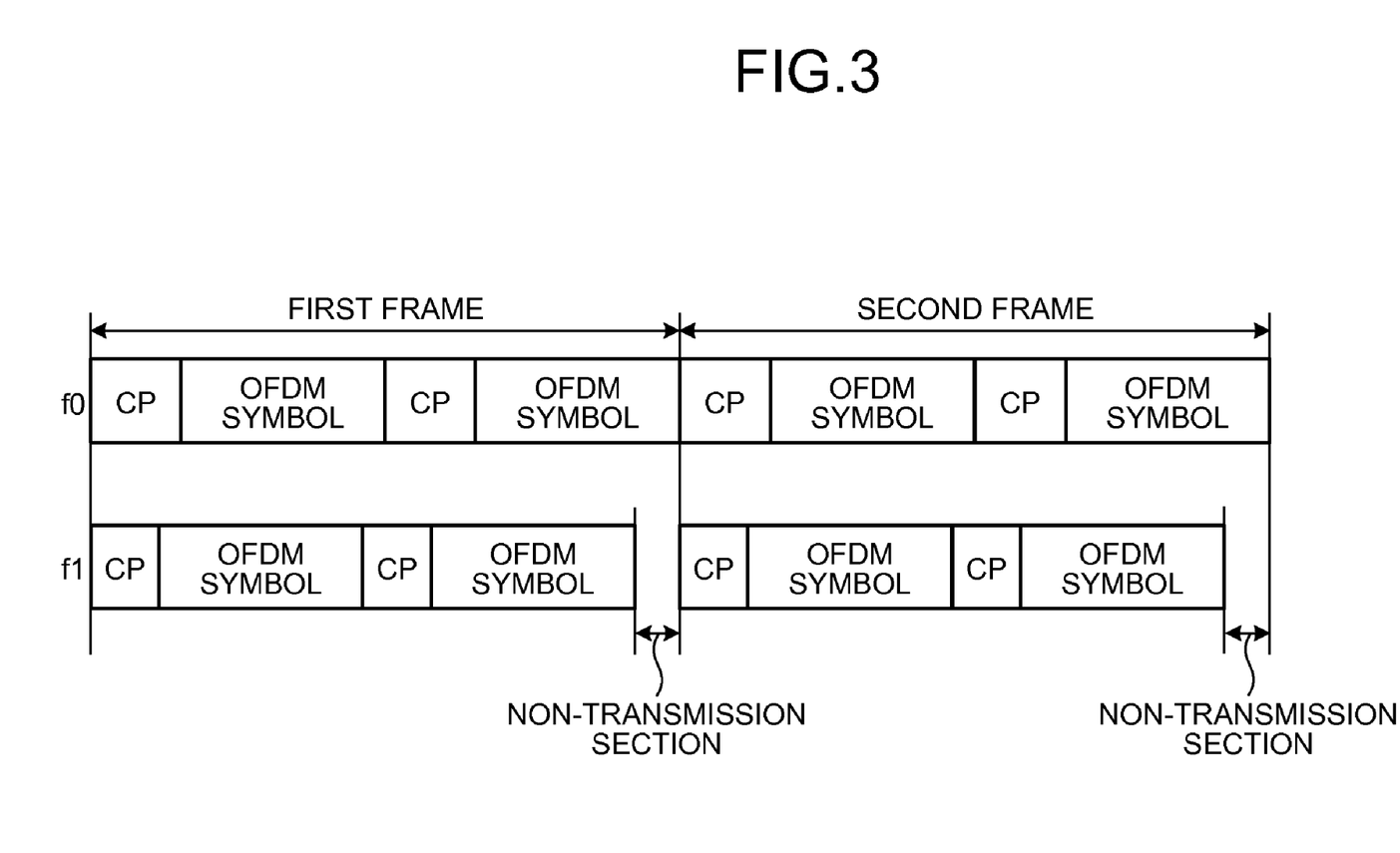
FIG. 3 is a diagram for explaining a wireless communication controlling method according to a second embodiment.

First, the wireless communication controlling method according to the second embodiment is explained. FIG. 3 is a diagram for explaining the wireless communication controlling method according to the second embodiment. As depicted in FIG. 3, it is assumed that a frequency f0 and a frequency f1 are used to achieve frequency aggregation, where the frame length at the frequency f0 and the frame length at the frequency f1 are different from each other.

In the wireless communication controlling method according to the second embodiment, when the frame lengths differ for each frequency band, the frame in one frequency band is transmitted in accordance with the transmission timing of the frame in the other frequency band. For example, when the frame length at the frequency f0 is longer than the frame length at the frequency f1 and the frame at the frequency f1 is transmitted in accordance with the transmission timing of the frame at the frequency f0, as depicted in the example of FIG. 3, a non-transmission section is provided after transmission of the frame at the frequency f1.

The non-transmission section is a section in which no data is transmitted, and has a length equal to a difference between the frame length at the frequency f0 and the frame length at the frequency f1. In the non-transmission section, instead of transmitting no data at all, the last sample of the frame may be continuously transmitted.

On the other hand, when the frame length at the frequency f0 is longer than the frame length at the frequency f1 and the frame at the frequency f0 is transmitted in accordance with the transmission timing of the frame at the frequency f1, a portion of the frame at the frequency f0 corresponding to the difference from the frame at the frequency f1 is not transmitted. In this case, although the sample at the rear of the frame at the frequency f0 is not transmitted, the characteristics in OFDM are not significantly affected even if the last one sample is lost.

In this manner, for example, by inserting a non-transmission section to match the frame transmission timing of every frequency band with the frame transmission timing of the reference frequency band, the frame transmission timings of all frequency bands match each other. With the matching of the frame transmission timings, once the demodulation timing is detected in one frequency band at the receiving side, the demodulation timing in another frequency band can be known. Thus, the demodulation process can be simplified.

When the wireless communication controlling method according to the second embodiment is used, for the purpose of minimizing an influence due to insertion of the non-transmission section and a loss of the tail of the frame, the sampling interval and the CP length, for example, are desirably adjusted so that the frame lengths at the respective frequency bands are made as uniform as possible.

Next, the configuration of a wireless communication apparatus 20 that performs the wireless communication controlling method according to the second embodiment is explained. Note that, as for the wireless communication apparatus 20, only the difference from the wireless communication apparatus 10 depicted in FIG. 2 is explained herein.

Figure 4:
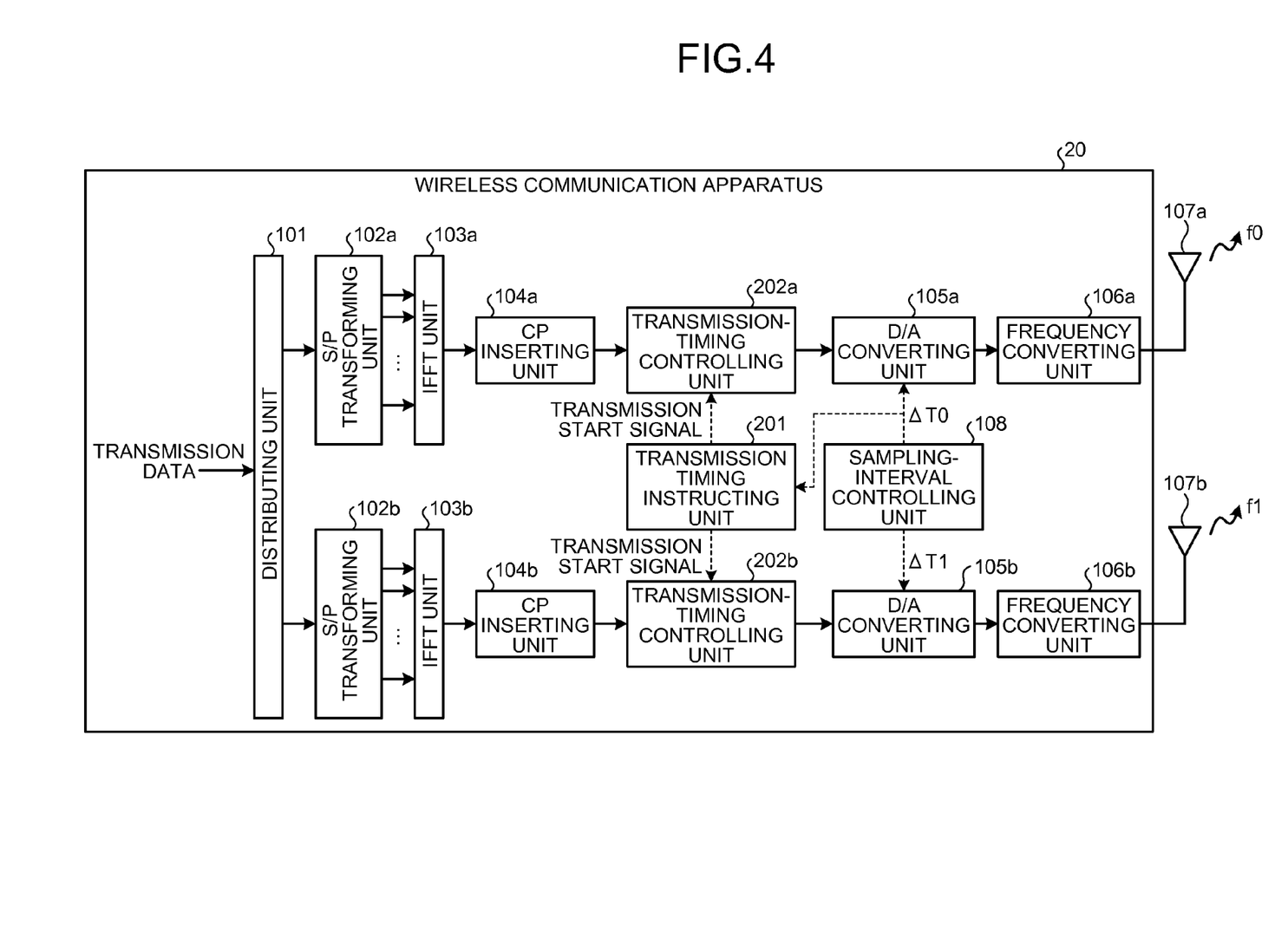
FIG. 4 is a block diagram of the configuration of a wireless communication apparatus according to the second embodiment.

FIG. 4 is a block diagram of the configuration of the wireless communication apparatus 20 according to the second embodiment. As depicted in FIG. 4, the wireless communication apparatus 20 includes, in addition to the units of the wireless communication apparatus 10 depicted in FIG. 2, a transmission-timing instructing unit 201 and transmission-timing controlling units 202a and 202b. The transmission-timing controlling unit 202a is provided between the CP inserting unit 104a and the D/A converting unit 105a, whilst the transmission-timing controlling unit 202b is provided between the CP inserting unit 104b and the D/A converting unit 105b.

The transmission-timing instructing unit 201 transmits a transmission start signal to each transmission-timing controlling unit 202 in accordance with the transmission timing of a frame at a reference frequency band. The timing of transmitting a transmission start signal from the transmission-timing instructing unit 201 is determined by, for example, the number of OFDM symbols and the CP length included in a frame at the reference frequency band and the sampling interval of the D/A converting unit 105 corresponding to the reference frequency band.

In the example of FIG. 4, the frequency f0 is taken as a reference. The sampling interval $\Delta T0$ for output from the sampling-interval controlling unit 108 to the D/A converting unit 105a is also output to the transmission-timing instructing unit 201.

The transmission-timing controlling unit 202 starts outputting frame data output from the corresponding CP inserting unit 104 at the timing of receiving the transmission start signal to the corresponding D/A converting unit 105. Then, upon completion of output of the entire frame before receiving the next transmission start signal, the transmission-timing controlling unit 202 outputs 0 until it receives the next transmission start signal to make a non-transmission section. In this case, the transmission-timing controlling unit 202 may output the last sample of the frame data until it receives the next transmission start signal.

Also, when receiving the next transmission start signal before completion of output of the entire frame data, the transmission-timing controlling unit 202 halts the current output of the frame data and starts outputting the next frame data.

The sampling interval and the sub-carrier interval for each frequency band and the number of OFDM symbols and the CP length in a frame may be determined in advance or dynamically determined. Also, it may be determined in advance which frequency band is taken as a reference as to the frame transmission timing, or this reference frequency band may be dynamically determined for the purpose of, by way of example, minimizing a difference in timing.

Figure 5:
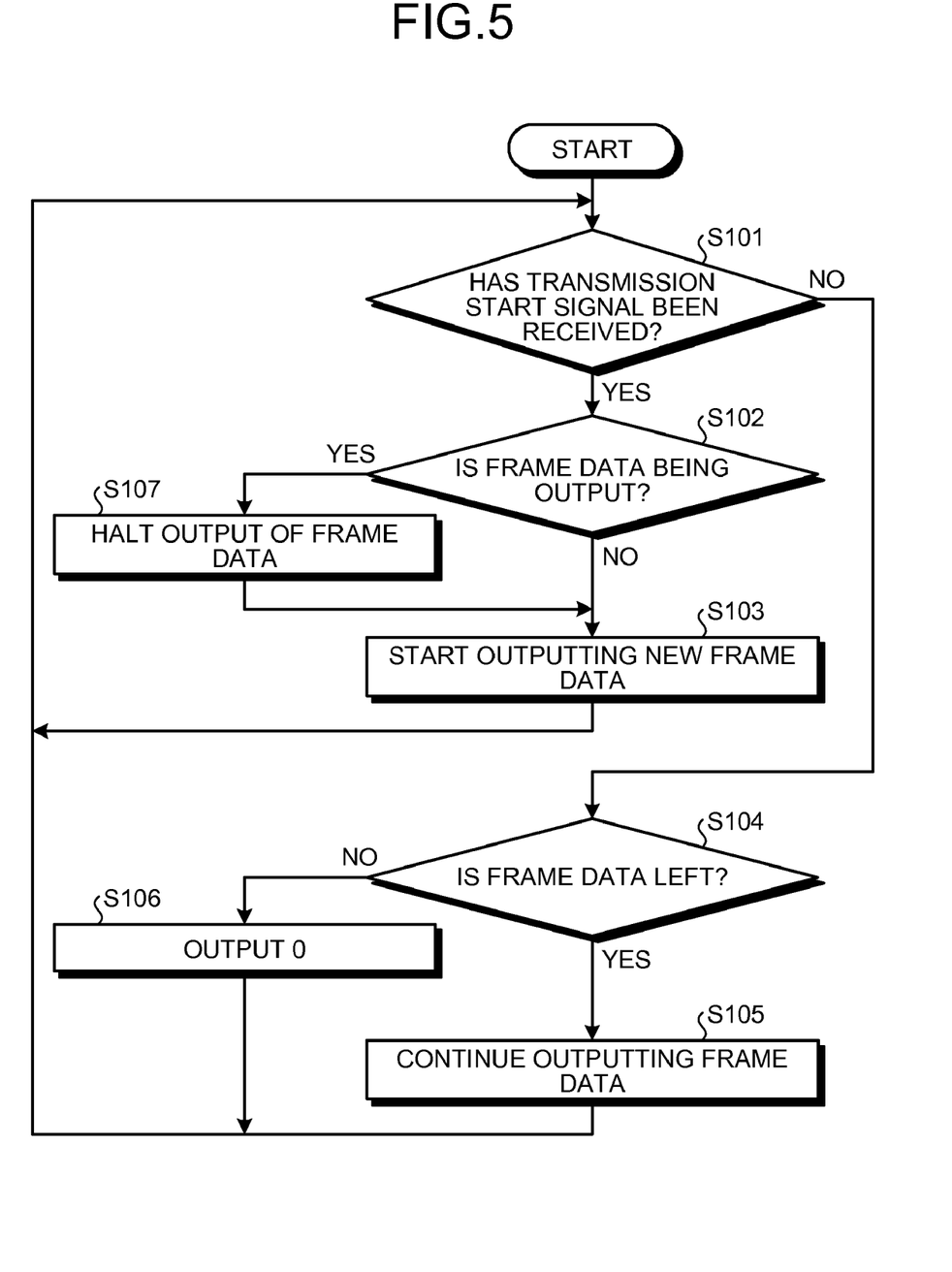
FIG. 5 is a flowchart of a process procedure of a transmission-timing controlling unit.

Next, the process procedure of the transmission-timing controlling unit 202 depicted in FIG. 4 is explained. FIG. 5 is a flowchart of the process procedure of the transmission-timing controlling unit 202. As depicted in FIG. 5, if having received a transmission start signal (Yes at Step S101) and not outputting any frame data (No at Step S102), the transmission-timing controlling unit 202 starts outputting new frame data (Step S103). Then, after the start of outputting the frame data, the transmission-timing controlling unit 202 returns to Step S101 to check whether the next transmission start signal has been received.

If the next transmission start signal has not been received (No at Step S101) and the frame data being output is still left (Yes at Step S104), the transmission-timing controlling unit 202 continues outputting the frame data (Step S105). The transmission-timing controlling unit 202 then returns to Step S101 to check whether the next transmission start signal has been received.

If the next transmission start signal has not been received (No at Step S101) and the output of the entire frame data has been completed (No at Step S104), the transmission-timing controlling unit 202 outputs 0 (Step S106). The transmission-timing controlling unit 202 then returns to Step S101 to check whether the next transmission start signal has been received.

If having received the next transmission start signal (Yes at Step S101) and not outputting any frame data (No at Step S102), the transmission-timing controlling unit 202 starts outputting new frame data (Step S103). On the other hand, if outputting any frame data (Yes at Step S102), after halting the output of the frame data (Step S107), the transmission timing controlling unit 202 starts outputting new frame data (Step S103). Then, after the start of outputting the frame data, the transmission-timing controlling unit 202 returns to Step S101 to check whether the next transmission start signal has been received.

As explained above, in the second embodiment, by providing a non-transmission section, for example, the frame at one frequency band is transmitted in accordance with the transmission timing of a frame at another reference frequency band. With this, the demodulation process at the receiving side can be simplified.

In the second embodiment, the example is explained in which the transmission timings of frames at respective frequency bands are matched with each other by, for example, providing a non-transmission section. Alternatively, the transmission timings of frames at respective frequency bands can also be matched with each other by adjusting the CP length. In a third embodiment, an example of adjusting the CP length to match the frame transmission timings is explained.

Figure 6:
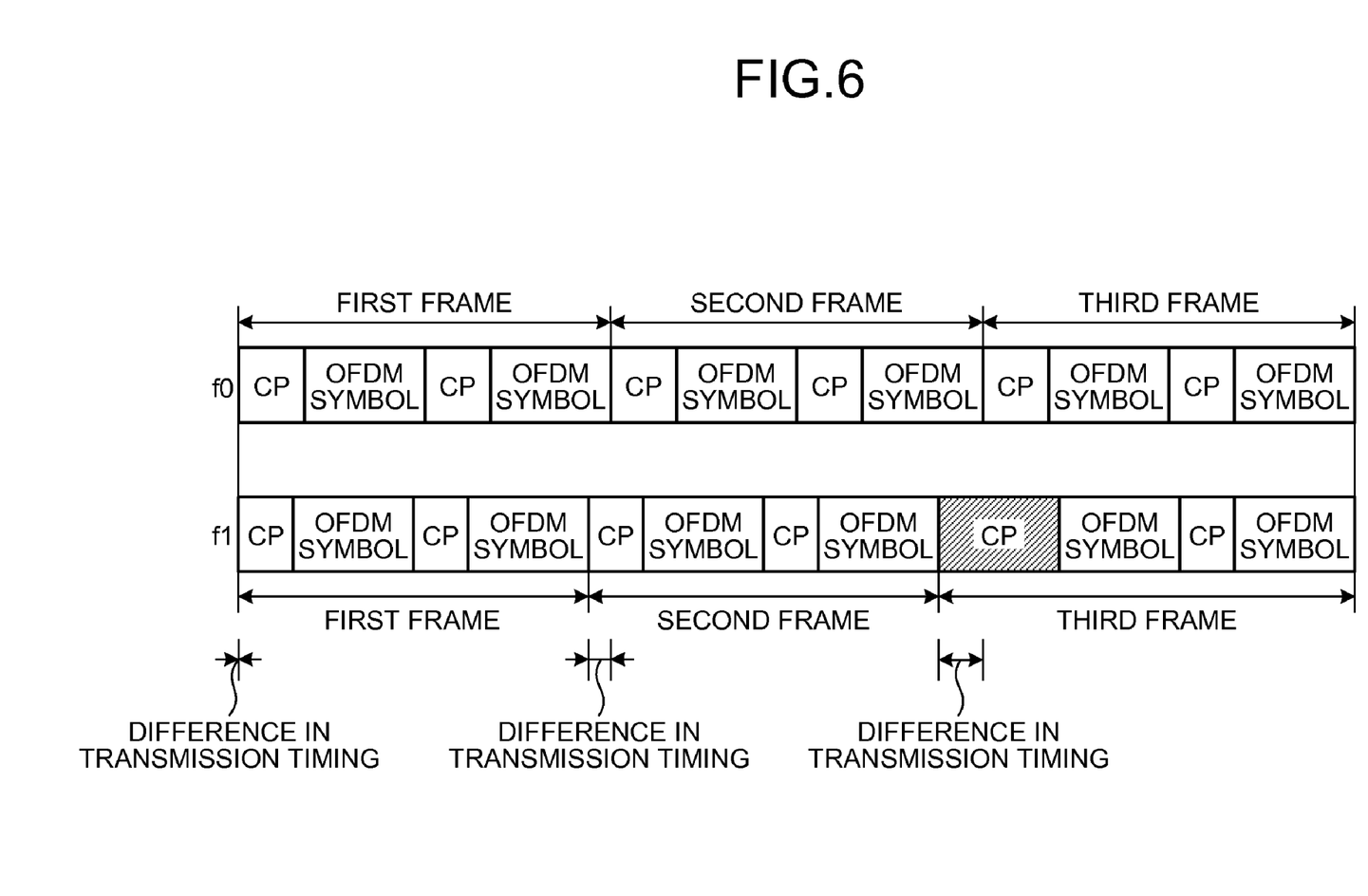
FIG. 6 is a diagram for explaining a wireless communication controlling method according to a third embodiment.

First, a wireless communication controlling method according to the third embodiment is explained. FIG. 6 is a diagram for explaining the wireless communication controlling method according to the third embodiment. As depicted in FIG. 6, it is assumed that frequency aggregation is achieved by using the frequencies f0 and f1 and the frame length at the frequency f0 and the frame length at the frequency f1 are different from each other.

In the wireless communication controlling method according to the third embodiment, when the frame length is different for each frequency band, with reference to the transmission timing of a frame at one frequency band, a difference in transmission timing of a frame at another frequency band is calculated. Then, when any frequency band whose difference in frame transmission timing is greater than a threshold is present, the CP length of a frame at that frequency band is temporarily changed to approximately match the following frame transmission timings with each other.

In the example of FIG. 6, the frame length at the frequency f1 is shorter than the frame length at the frequency f0. Therefore, every time a frame is transmitted, the transmission timing of a frame at the frequency f1 becomes earlier than the transmission timing of a frame at the reference frequency f0. Then, the difference in frame transmission timing at the stage of transmitting the third frame is greater than the threshold, and therefore the CP length at the head of the third frame is temporarily increased. As a result, the transmission timings of the next frame match each other. Although the CP length at the head of the frame is changed in this example, the CP with its length to be changed may be at any position in a frame. Also, a plurality of CPs may have their length changed.

On the other hand, when the frame length at the frequency f1 is longer than the frame length at the frequency f0, the CP length of the frame at the frequency f1 is temporarily decreased at the stage where the difference in frame transmission timing becomes greater than a reference value, thereby adjusting the frame transmission timing.

In this manner, by temporarily changing the CP length, the frame transmission timing at every frequency band is matched with the frame transmission timing at the reference frequency band, thereby approximately matching the frame transmission timings of all frequency bands. In OFDM, even if the demodulation timing is shifted by several samples, demodulation can be performed without significantly affecting the characteristics. Therefore, with the frame transmission timings being approximately matched each other, the demodulation timing detected in one frequency band is used at the receiving side for demodulation for other frequency bands, thereby simplifying the demodulation process.

When the wireless communication controlling method according to the third embodiment is used, for the purpose of minimizing an influence due to a change of the CP frame, the sampling interval and the CP length, for example, are desirably adjusted so that the frame lengths at the respective frequency bands are made as uniform as possible.

Next, the configuration of a wireless communication apparatus 30 that performs the wireless communication controlling method according to the third embodiment is explained. Note that, as for the wireless communication apparatus 30, only the difference from the wireless communication apparatus 10 depicted in FIG. 2 is explained herein. Also, it is assumed in the wireless communication apparatus 30 that the transmission timing of a frame at the frequency f0 is taken as a reference.

Figure 7:
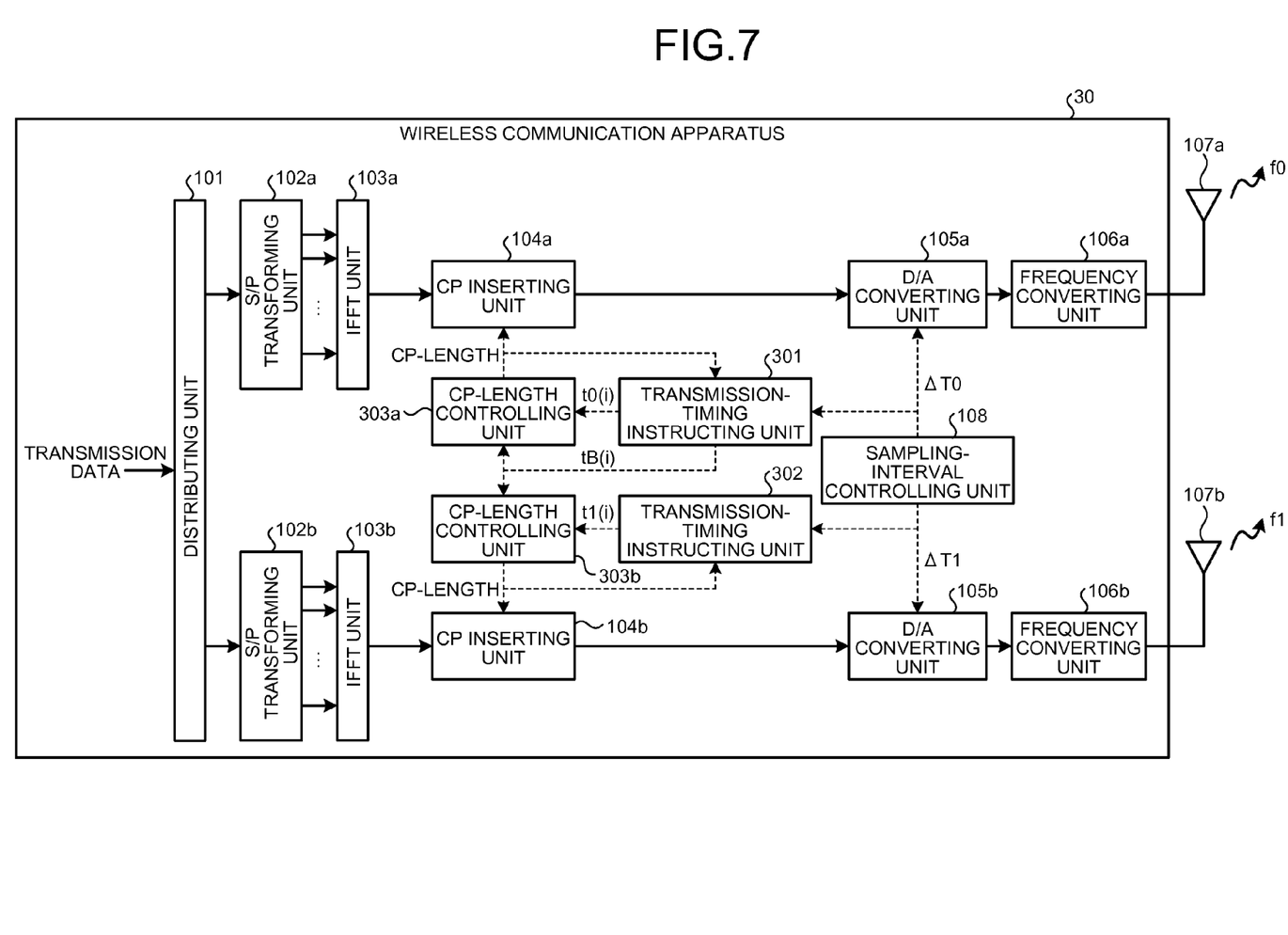
FIG. 7 is a block diagram of the configuration of a wireless communication apparatus according to the third embodiment.

FIG. 7 is a block diagram of the configuration of the wireless communication apparatus 30 according to the third embodiment. As depicted in FIG. 7, the wireless communication apparatus 30 includes, in addition to the units of the wireless communication apparatus 10 depicted in FIG. 2, a transmission-timing instructing unit 301, a transmission-timing instructing unit 302, and CP-length controlling units 303a and 303b.

The transmission-timing instructing units 301 and 302 each notify the corresponding CP-length controlling unit 303 of a transmission timing of a frame at the corresponding frequency band. Specifically, the transmission-timing instructing unit 301 notifies the CP-length controlling unit 303a of t0(*i*) as a transmission timing of a frame at the frequency f0, whilst the transmission-timing instructing unit 302 notifies the CP-length controlling unit 303b of t1(*i*) as a transmission timing of a frame at the frequency f1. Here, t0(*i*) indicates a transmission timing of an i-th frame at the frequency f0, whilst t1(*i*) indicates a transmission timing of an i-th frame at the frequency f1.

Furthermore, the transmission-timing instructing unit 301 notifies each CP-length controlling unit 303 of a transmission timing of a frame in a reference frequency band. Specifically, the transmission-timing instructing unit 301 notifies the CP-length controlling units 303a and 303b of tB(i) as a transmission timing of a frame at the frequency f0. Here, tB(i) indicates a transmission timing of an i-th frame at the frequency f0 in a reference frequency band.

Here, the transmission-timing instructing units 301 and 302 each determine the frame transmission timing based on, for example, the number of OFDM symbols included in a frame in the corresponding frequency band, the CP length determined by the corresponding CP-length controlling unit 303, or the sampling interval of the corresponding frequency band.

The CP-length controlling unit 303 determines the CP length based on a difference between two transmission timings notified, and then instructs the corresponding CP inserting unit 104 to insert a CP with the determined length. Specifically, when the transmission timing (t0(*i*) or t1(*i*)) of a frame in the corresponding frequency band is earlier by a predetermined amount of time than the transmission timing (tB(i)) of a frame in the reference frequency band, the CP-length controlling unit 303 temporarily increases the CP length. On the other hand, when the transmission timing (t0(*i*) or t1(*i*)) of a frame in the corresponding frequency band is later by a predetermined amount of time than the transmission timing (tB(i)) of a frame in the reference frequency band, the CP-length controlling unit 303 temporarily decreases the CP length. With such control, the frame transmission timings in every frequency band can be kept matched with the reference frame transmission timing.

In the example of FIG. 7, the CP-length controlling unit 303a corresponds to the frequency f0, and notifies the CP inserting unit 104a of the CP length. Also, to reflect the change in CP length onto the notification of the transmission timing of the next frame, the CP-length controlling unit 303a also notifies the transmission-timing instructing unit 301 of the CP length. The CP-length controlling unit 303b corresponds to the frequency f1, and notifies the CP inserting unit 104b of the CP length. Also, to reflect the change in CP length onto the notification of the transmission timing of the next frame, the CP-length controlling unit 303b also notifies the transmission-timing instructing unit 302 of the CP length.

The sampling interval and the sub-carrier interval for each frequency band and the number of OFDM symbols and the standard CP length in a frame may be determined in advance or dynamically determined. Also, it may be determined in advance which frequency band is taken as a reference as to the frame transmission timing, or this reference frequency band may be dynamically determined.

Figure 8:
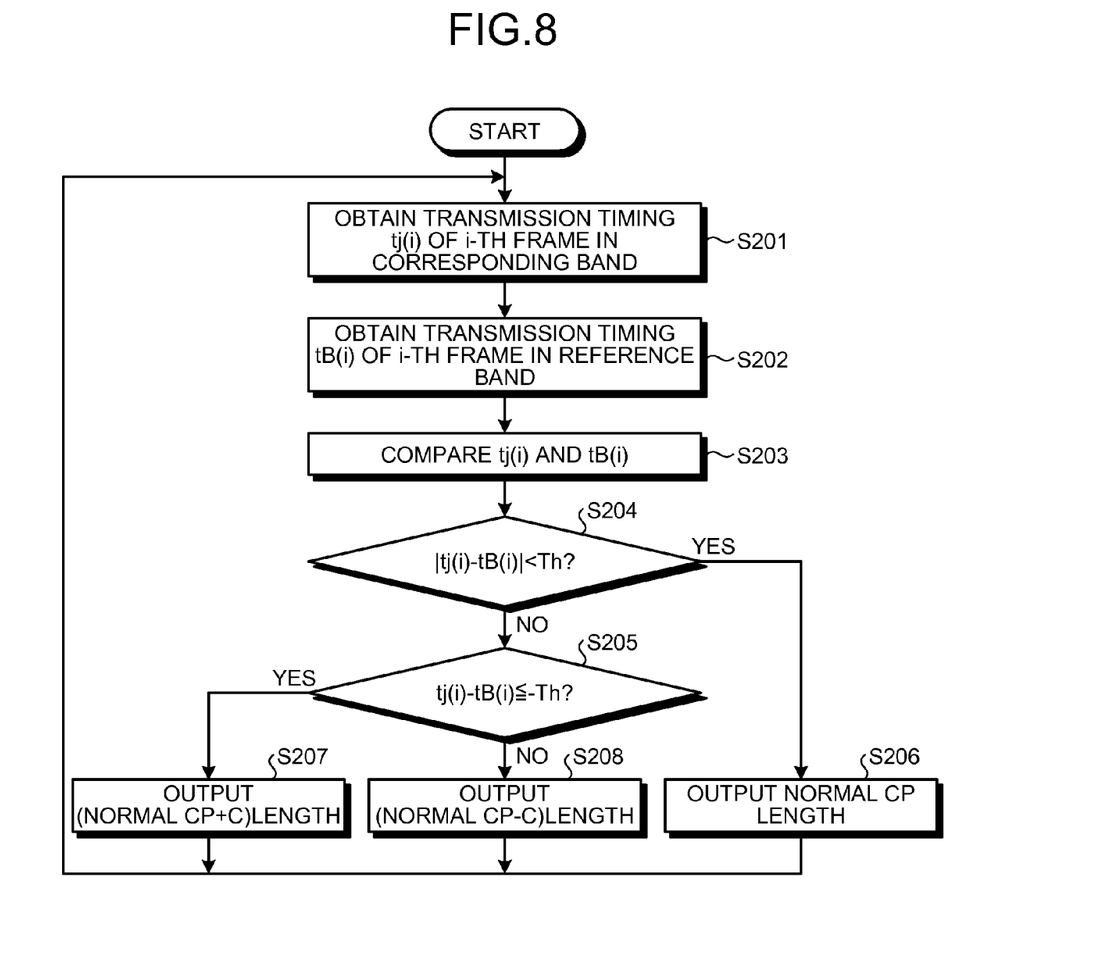
FIG. 8 is a flowchart of a process procedure of a CP-length controlling unit.

Next, the process procedure of the CP-length controlling unit 303 depicted in FIG. 7 is explained. FIG. 8 is a flowchart of the process procedure of the CP-length controlling unit 303. As depicted in FIG. 8, the CP-length controlling unit 303 obtains a transmission timing tj(i) of an i-th frame in the corresponding frequency band (Step S201). The CP-length controlling unit 303 also obtains a transmission timing tB(i) of an i-th frame in a reference frequency band (Step S202). The CP-length controlling unit 303 then compares the obtained tj(i) and tB(i) (Step S203).

When a difference between tj(i) and tB(i) is smaller than a threshold Th (Yes at Step S204), the CP-length controlling unit 303 outputs a normal value as a CP length to the corresponding CP inserting unit 104 (Step S206).

When a value obtained by subtracting tB(i) from tj(i) is equal or smaller than −Th (No at Step S204 and Yes at Step S205), the CP-length controlling unit 303 outputs, as a CP length, a value obtained by adding a fixed value C to the normal value to the corresponding CP inserting unit 104 (Step S207). Here, the value obtained by subtracting tB(i) from tj(i) being equal or smaller than −Th means that tj(i) is earlier than tB(i) by an amount equal to or greater than the threshold Th.

When the value obtained by subtracting tB(i) from tj(i) is equal to or greater than the threshold Th (No at Step S204 and No at Step S205), the CP-length controlling unit 303 outputs, as a CP length, a value obtained by subtracting the fixed value C from the normal value to the corresponding CP inserting unit 104 (Step S208). The value obtained by subtracting tB(i) from tj(i) being equal to or greater than the threshold Th means that tj(i) is later than tB(i) by an amount equal to or greater than the threshold Th.

After outputting the CP length to the CP inserting unit 104 in the manner explained above, the CP-length controlling unit 303 restarts the process from Step S201. In the example of FIG. 8, the fixed value C is added to or subtracted from the normal CP length value. Alternatively, a variable value, such as a difference value between tj(i) and tB(i), may be added or subtracted.

As explained above, in the third embodiment, the CP length is adjusted to transmit a frame in every frequency band in accordance with the transmission timing of a frame in one frequency band. Therefore, the demodulation process at the receiving side can be simplified.

In the second and third embodiments, the frame transmission timings for every frequency bands are matched each other by, for example, providing a non-transmission section. Alternatively, the frame transmission timings can also be matched each other by adjusting the sub-carrier interval to eliminate the difference in frame length for every frequency band. Thus, in a fourth embodiment, an example of adjusting the sub-carrier interval to match the frame transmission timings is explained.

First, a wireless communication controlling method according to the fourth embodiment is explained. For example, when it is assumed that the FFT length is 256, the CP length is 44, and five symbols form one frame, the frame length in a frequency band is composed of (256+44)×5=1500 samples. When this frame length is longer than a reference frame length by one sample, the sub-carrier interval is corrected by $1/1500=0.0667\%$. Since such a degree of correction hardly affects Doppler shift characteristics, the frame transmission timings in every frequency band can be matched each other with Doppler shift characteristics being kept. Note that a change in sub-carrier interval can be achieved by changing the sampling interval.

Next, the configuration of a wireless communication apparatus 40 that performs the wireless communication controlling method according to the fourth embodiment is explained. Note that, as for the wireless communication apparatus 40, only the difference from the wireless communication apparatus 10 depicted in FIG. 2 is explained herein.

Figure 9:
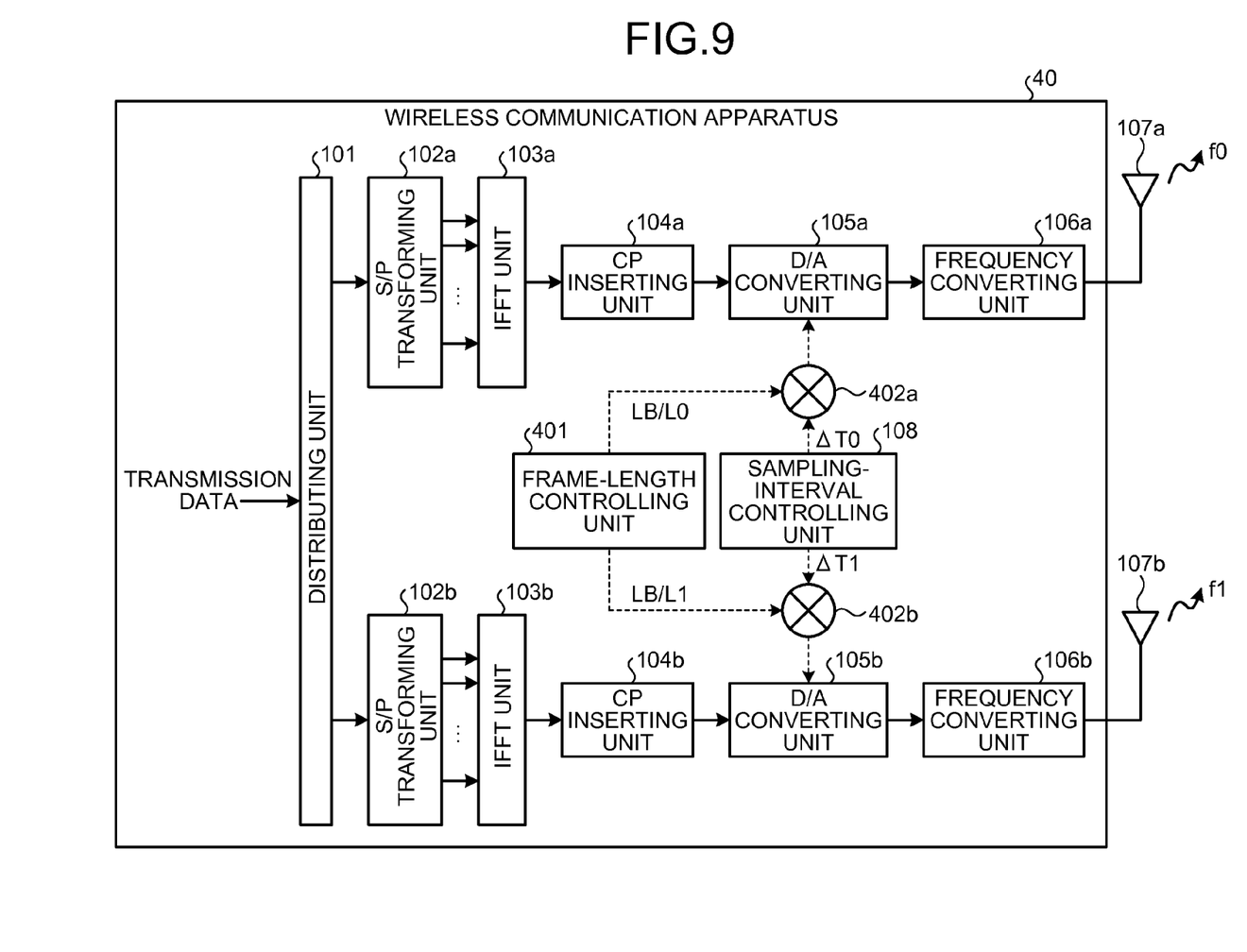
FIG. 9 is a block diagram of the configuration of a wireless communication apparatus according to a fourth embodiment.

FIG. 9 is a block diagram of the configuration of the wireless communication apparatus 40 according to the fourth embodiment. As depicted in FIG. 9, the wireless communication apparatus 40 includes, in addition to the units of the wireless communication apparatus 10 depicted in FIG. 2, a frame-length controlling unit 401 and computing units 402a and 402b.

The frame-length controlling unit 401 notifies the computing unit 402 of the corresponding frequency band of a ratio between the frame length of the reference frequency band and the frame length of the relevant frequency band. Specifically, the frame-length controlling unit 401 notifies the computing unit 402a of LB/L0 and the computing unit 402b of LB/L1. Here, LB is a frame length in a reference frequency band, L0 is a frame length at the frequency f0, and L1 is a frame length at the frequency f1.

The computing unit 402 corrects the sampling interval specified by the sampling-interval controlling unit 108 with the ratio notified by the frame-length controlling unit 401. Specifically, the computing unit 402a outputs to the D/A converting unit 105a a value obtained by multiplying the sampling interval ΔT0 by LB/L0 as a sampling interval. Also, the computing unit 402b outputs to the D/A converting unit 105b a value obtained by multiplying the sampling interval ΔT1 by LB/L1 as a sampling interval.

In this manner, the sampling interval specified by the sampling-interval controlling unit 108 is corrected with the ratio notified by the frame-length controlling unit 401, thereby making the frame length for every frequency band equal to the frame length in the reference frequency band.

As explained above, in the fourth embodiment, by correcting the sub-carrier interval (sampling interval), the frame lengths for every frequency band are made uniform, thereby simplifying the demodulation process at the receiving side.

According to the embodiments, the demodulation process at the receiving side can be simplified.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A wireless communication apparatus that transmits data to a counter apparatus by using a plurality of frequencies, the wireless communication apparatus comprising:
   a plurality of transmitting units that transmit the data corresponding to the frequencies;
   a distributing unit that distributes the data to be transmitted to the counter apparatus into the transmitting units; and
   a transmission-timing controlling unit that causes timings of transmitting frames from the transmitting units to match each other for every predetermined cycle, the frames each formed of the data distributed by the distributing unit, wherein
   the wireless communication apparatus employs OFDM (orthogonal frequency division multiplexing) as a modulation technique,
   the transmission-timing controlling unit causes timings of transmitting the frames from the transmitting units to match each other by adjusting a length of a cyclic prefix inserted in each of the frames and by changing the length of the cyclic prefix between the frames, the cyclic prefix being generated by copying a rear part of a OFDM symbol.

2. The wireless communication apparatus according to claim 1, wherein when a frame to be transmitted at a timing earlier than a timing of transmitting a frame at a reference frequency is present, the transmission-timing controlling unit increases the length of the cyclic prefix inserted in the frame to be transmitted at the earlier timing by a relevant transmitting unit of the transmitting units, and the length of the cyclic prefix is longer than a normal value.

3. The wireless communication apparatus according to claim 1, wherein when a frame to be transmitted at a timing later than a timing of transmitting a frame at a reference frequency is present, the transmission-timing controlling unit decreases the length of the cyclic prefix inserted in the frame to be transmitted at the later timing by a relevant transmitting unit of the transmitting units, and the length of the cyclic prefix is shorter than a normal value.

4. A wireless communication apparatus that transmits data to a counter apparatus by using a plurality of frequencies, the wireless communication apparatus comprising:
   a plurality of transmitting units that transmit the data corresponding to the frequencies;
   a distributing unit that distributes the data to be transmitted to the counter apparatus into the transmitting units; and
   a transmission-timing controlling unit that causes timings of transmitting frames from the transmitting units to match each other for every predetermined cycle, the frames each formed of the data distributed by the distributing unit, wherein
   the wireless communication apparatus employs orthogonal frequency division multiplexing as a modulation technique, and
   the transmission-timing controlling unit causes timings of transmitting the frames from the transmitting units to match each other by making lengths of frames to be transmitted from the transmitting units equal to each other and makes lengths of the frames transmitted from the transmitting units equal to each other by adjusting a sub-carrier interval of the frames.

5. A wireless communication apparatus that transmits data to a counter apparatus by using a plurality of frequencies, the wireless communication apparatus comprising:
   a plurality of transmitting units that transmit the data corresponding to the frequencies;
   a distributing unit that distributes the data to be transmitted to the counter apparatus into the transmitting units; and
   a transmission-timing controlling unit that causes timings of transmitting frames from the transmitting units to match each other for every predetermined cycle, the frames each formed of the data distributed by the distributing unit, wherein
   when a first frame of which transmission has been completed at a timing earlier than a timing of completion of transmitting a second frame at a reference frequency is present, after completion of transmission of the first frame, the transmission-timing controlling unit refrains a next frame from being transmitted from a relevant transmitting unit of the transmitting units that has completed transmission of the first frame until transmission of the second frame at the reference frequency is completed.

6. The wireless communication apparatus according to claim 5, wherein when a first frame of which transmission has been completed at a timing earlier than a timing of completion of transmitting a second frame at a reference frequency is present, after completion of transmission of the first frame, the transmission-timing controlling unit controls to transmit no data from a relevant transmitting unit of the transmitting units that has completed transmission of the first frame until transmission of the second frame at the reference frequency is completed.

7. The wireless communication apparatus according to claim 5, wherein when a first frame of which transmission has been completed at a timing earlier than a timing of completion of transmitting a second frame at a reference frequency is present, after completion of transmission of the first frame, the transmission-timing controlling unit controls to transmit data having a specific pattern from a relevant transmitting unit of the transmitting units that has completed transmission of the first frame until transmission of the second frame at the reference frequency is completed.

8. A wireless communication controlling method of controlling a wireless communication apparatus that transmits data to a counter apparatus by using a plurality of frequencies, the wireless communication controlling method comprising:
   distributing the data to be transmitted to the counter apparatus into a plurality of transmitting units corresponding to the frequencies; and
   causing timings of transmitting frames from the transmitting units to match each other for every predetermined cycle, the frames each formed of the distributed data, wherein
   the wireless communication apparatus employs OFDM (orthogonal frequency division multiplexing) as a modulation technique, and
   the causing includes causing timings of transmitting the frames from the transmitting units to match each other by adjusting a length of a cyclic prefix inserted in each of the frames and by changing the length of the cyclic prefix between the frames, the cyclic prefix being generated by copying a rear part of a OFDM symbol.

9. A wireless communication controlling method of controlling a wireless communication apparatus that transmits data to a counter apparatus by using a plurality of frequencies, the wireless communication controlling method comprising:

distributing the data to be transmitted to the counter apparatus into a plurality of transmitting units corresponding to the frequencies; and causing timings of transmitting frames from the transmitting units to match each other for every predetermined cycle, the frames each formed of the distributed data, wherein the wireless communication apparatus employs orthogonal frequency division multiplexing as a modulation technique, and the causing includes causing timings of transmitting the frames from the transmitting units to match each other by making lengths of frames to be transmitted from the transmitting units equal to each other and making lengths of the frames transmitted from the transmitting units equal to each other by adjusting a sub-carrier interval of the frames.

10. A wireless communication controlling method of controlling a wireless communication apparatus that transmits data to a counter apparatus by using a plurality of frequencies, the wireless communication controlling method comprising:

distributing the data to be transmitted to the counter apparatus into a plurality of transmitting units corresponding to the frequencies; and causing timings of transmitting frames from the transmitting units to match each other for every predetermined cycle, the frames each formed of the distributed data, wherein when a first frame of which transmission has been completed at a timing earlier than a timing of completion of transmitting a second frame at a reference frequency is present, after completion of transmission of the first frame, the causing includes refraining a next frame from being transmitted from a relevant transmitting unit of the transmitting units that has completed transmission of the first frame until transmission of the second frame at the reference frequency is completed.

* * * * *